(12) United States Patent
Shibata

(10) Patent No.: US 9,995,236 B2
(45) Date of Patent: Jun. 12, 2018

(54) FUEL CONTROL SYSTEMS AND METHODS FOR DELAY COMPENSATION

(71) Applicant: GM Global Technology Operations LLC, Detroit, MI (US)

(72) Inventor: Jonathan T. Shibata, Whitmore Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 15/218,226

(22) Filed: Jul. 25, 2016

(65) Prior Publication Data

US 2018/0023499 A1    Jan. 25, 2018

(51) Int. Cl.
*F02D 41/30* (2006.01)
*G05B 11/42* (2006.01)
*G05D 7/06* (2006.01)
*F02D 41/14* (2006.01)

(52) U.S. Cl.
CPC ......... *F02D 41/30* (2013.01); *F02D 41/1439* (2013.01); *F02D 41/1454* (2013.01); *F02D 41/1473* (2013.01); *F02D 41/1482* (2013.01); *F02D 41/1483* (2013.01); *G05B 11/42* (2013.01); *G05D 7/0635* (2013.01); *F02D 2200/0614* (2013.01); *F02D 2200/0618* (2013.01)

(58) Field of Classification Search
CPC ........ F02D 41/30–41/408; F02D 41/14; F02D 41/1418; F02D 41/1438; F02D 41/1439; F02D 41/1444; F02D 41/1445; F02D 41/1454–41/1458; F02D 41/1473; F02D 41/1474; F02D 41/1477; F02D 41/1482; F02D 41/1483; F02D 2200/0614–2200/0616
USPC .......................................... 701/103–105, 109
See application file for complete search history.

(56) References Cited

U.S. PATENT DOCUMENTS

| | | | | |
|---|---|---|---|---|
| 4,290,400 A * | 9/1981 | Pomerantz | .......... | F02D 41/1481 123/679 |
| 5,692,487 A * | 12/1997 | Schuerz | ............. | F02D 41/1477 123/696 |
| 6,233,922 B1 * | 5/2001 | Maloney | ............. | F02D 41/1401 123/674 |
| 2011/0132341 A1 * | 6/2011 | Magner | ................ | F02D 41/047 123/703 |

* cited by examiner

*Primary Examiner* — Erick Solis
*Assistant Examiner* — Robert Werner

(57) ABSTRACT

A delay module, based on a base request received for a first loop, sets a delayed base request for a second loop. A first period between the first and second loops corresponds to: a first delay period of an oxygen sensor; and a second delay period for exhaust to flow from a cylinder of an engine to the oxygen sensor. A closed loop module determines a closed loop correction for the second loop based on: the delayed base request for the second loop; a measurement from the oxygen sensor; the closed loop correction for the first loop; and the closed loop correction for a third loop. A second period between the second and third loops corresponds to the first delay period of the oxygen sensor. A summer module sets a final request for the second loop based on the base request plus the closed loop correction for the second loop.

20 Claims, 4 Drawing Sheets

FUEL CONTROL SYSTEMS AND METHODS FOR DELAY COMPENSATION

FIELD

The present disclosure relates to internal combustion engines and more particularly to fuel control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel control system controls provision of fuel to an engine. The fuel control system determines target fueling parameters based on a target equivalence ratio (EQR). To reach the target EQR, the fuel control system controls the amount of fuel provided to the engine based on data from one or more universal exhaust gas oxygen (UEGO) sensors. For example only, when a UEGO sensor indicates that the exhaust gas is (fuel) rich relative to the target EQR, the fuel control system may decrease the amount of fuel provided to the engine. Conversely, the fuel control system may increase the amount of fuel provided to the engine when the exhaust gas is lean relative to the target EQR. Adjusting the amount of fuel provided to the engine based on UEGO measurements modulates the air/fuel mixture combusted within the engine at approximately the target EQR (e.g., a stoichiometric EQR).

SUMMARY

In a feature, a fuel control system of a vehicle is described. An equivalence ratio (EQR) delay module, based on a base EQR request received for a first control loop, sets a delayed base EQR request for a second control loop. A first period between the first and second control loops corresponds to a sum of: a first delay period of an exhaust gas oxygen (EGO) sensor; and a second delay period for exhaust to flow from a cylinder of an engine to the EGO sensor. A closed loop module determines a closed loop correction for the second control loop based on: the delayed base EQR request for the second control loop; an EQR measured using the EGO sensor for the second control loop; a first value of the closed loop correction determined for the first control loop; and a second value of the closed loop correction determined for a third control loop. A second period between the second and third control loops corresponds to the first delay period of the EGO sensor. A summer module sets a final EQR request for the second control loop based on the base EQR request for the second control loop plus the closed loop correction for the second control loop. A fuel actuator module controls fuel injection to the engine based on the final EQR request.

In further features, the summer module sets the final EQR request for the second control loop equal to the base EQR request for the second control loop plus the closed loop correction for the second control loop.

In further features, a feedback module that determines a feedback value for the second control loop as a function of: the delayed base EQR request for the second control loop; the EQR measured using the EGO sensor for the second control loop; the first value of the closed loop correction determined for the first control loop; and the second value of the closed loop correction determined for the third control loop. The closed loop module determines the closed loop correction for the second control loop based on the feedback value determined for the second control loop and one or more values of the feedback value determined for one or more other control loops, respectively.

In further features, the closed loop module determines the closed loop correction for the second control loop using a proportional-integral (PI) controller based on the feedback value determined for the second control loop and one or more values of the feedback value determined for one or more control loops, respectively.

In further features, the feedback module sets the feedback value based on: the delayed base EQR request for the second control loop; minus a first difference between (i) the EQR measured using the EGO sensor for the second control loop and (ii) the first value of the closed loop correction determined for the first control loop; minus the second value of the closed loop correction determined for the third control loop.

In further features, an exhaust flow rate module determines a flow rate of exhaust through an exhaust system of the engine, and the EQR delay module sets at least one of the first period and the second period based on the flow rate of exhaust.

In further features: the first period is a fixed, predetermined value; and the EQR delay module sets the second period based on the flow rate of exhaust.

In further features, the exhaust flow rate module determines the flow rate of exhaust through the exhaust system of the engine based on at least one of a mass flowrate of air into the engine and an engine speed.

In further features, the EGO sensor is located upstream of a catalyst in an exhaust system of the engine.

In further features, a command generator module generates the base EQR request based on a stoichiometric EQR.

In a feature, a fuel control method for a vehicle includes, based on a base equivalence ratio (EQR) request received for a first control loop, setting a delayed base EQR request for a second control loop, wherein a first period between the first and second control loops corresponds to a sum of: a first delay period of an exhaust gas oxygen (EGO) sensor; and a second delay period for exhaust to flow from a cylinder of an engine to the EGO sensor. The fuel control method further includes: determining a closed loop correction for the second control loop based on: the delayed base EQR request for the second control loop; an EQR measured using the EGO sensor for the second control loop; a first value of the closed loop correction determined for the first control loop; and a second value of the closed loop correction determined for a third control loop, wherein a second period between the second and third control loops corresponds to the first delay period of the EGO sensor. The fuel control method further includes: setting a final EQR request for the second control loop based on the base EQR request for the second control loop plus the closed loop correction for the second control loop; and controlling fuel injection to the engine based on the final EQR request.

In further features, setting the final EQR request includes setting the final EQR request for the second control loop equal to the base EQR request for the second control loop plus the closed loop correction for the second control loop.

In further features, the fuel control method further includes determining a feedback value for the second control loop as a function of: the delayed base EQR request for the second control loop; the EQR measured using the EGO sensor for the second control loop; the first value of the closed loop correction determined for the first control loop; and the second value of the closed loop correction determined for the third control loop. Determining the closed loop correction includes determining the closed loop correction for the second control loop based on the feedback value determined for the second control loop and one or more values of the feedback value determined for one or more other control loops, respectively.

In further features, determining the closed loop correction includes determining the closed loop correction for the second control loop using a proportional-integral (PI) controller based on the feedback value determined for the second control loop and one or more values of the feedback value determined for one or more control loops, respectively.

In further features, setting the feedback value includes setting the feedback value based on: the delayed base EQR request for the second control loop; minus a first difference between (i) the EQR measured using the EGO sensor for the second control loop and (ii) the first value of the closed loop correction determined for the first control loop; minus the second value of the closed loop correction determined for the third control loop.

In further features, the fuel control method further includes: determining a flow rate of exhaust through an exhaust system of the engine; and setting at least one of the first period and the second period based on the flow rate of exhaust.

In further features: the first period is a fixed, predetermined value; and setting at least one of the first period and the second period includes setting the second period based on the flow rate of exhaust.

In further features, determining the flow rate of exhaust includes determining the flow rate of exhaust through the exhaust system of the engine based on at least one of a mass flowrate of air into the engine and an engine speed.

In further features, the EGO sensor is located upstream of a catalyst in an exhaust system of the engine.

In further features, the fuel control method further includes generating the base EQR request based on a stoichiometric EQR.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel to produce torque. Exhaust gas oxygen (EGO) sensors measure amounts of oxygen in the exhaust at locations upstream and downstream of a catalyst. EGO sensors may also be referred to as air/fuel sensors. Wide range air/fuel (WRAF) sensors and universal EGO (UEGO) sensors measure values between values indicative of rich and lean operation, while switching EGO and switching air/fuel sensors only toggle between the values indicative of rich and lean operation.

A fuel control module generates a final equivalence ratio (EQR) request using both feedback control and feedforward control. The fuel control module controls fuel injection based on the final EQR request. Regarding the feedback control, the fuel control module adjusts a base EQR request based on a difference between a measured EQR measured by an EGO sensor upstream of a catalyst in the exhaust at a given instance and an expected EQR for that given instance. The fuel control module determines the expected EQR based on compensating for delays, such as an engine delay, a transport delay, and a sensor delay, which are discussed further below. Regarding the feedforward control, the fuel control module determines the final EQR request based on the adjusted base EQR request and the base EQR request. This use of feedback and feedforward control minimizes overshoot and undershoot of the final EQR request and allows the fuel control module to more closely track and achieve the final EQR request.

Figure 1:
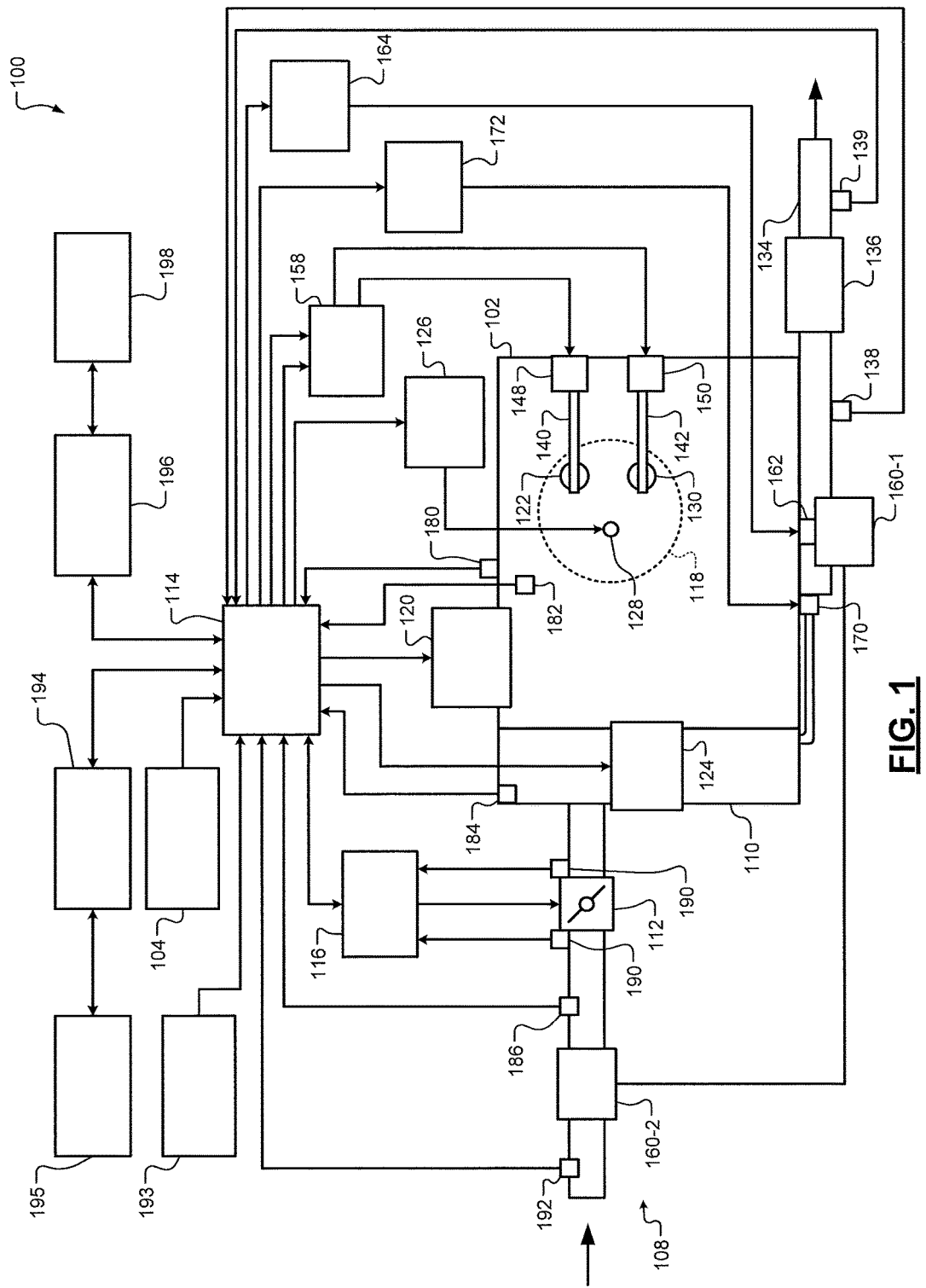
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders.

The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134. The exhaust system 134 includes a catalyst 136, such as a three-way catalyst (TWC) or a four-way catalyst. The catalyst 136 reacts with components of the exhaust, such as nitrogen oxides (NOx), carbon monoxide (CO), Carbon dioxide ($CO_2$), etc.

An upstream exhaust gas oxygen (EGO) sensor (US EGO sensor) 138 is located upstream from the catalyst 136. A downstream EGO sensor (DS EGO sensor) 139 is located downstream from the catalyst 136. The US EGO sensor 138 may be located, for example, at a confluence point of exhaust runners of an exhaust manifold or at another suitable location.

The US and DS EGO sensors 138 and 139 measure an amount of oxygen in the exhaust at their respective locations and generate an EGO signal based on the amounts of oxygen. For example only, the US EGO sensor 138 generates an upstream EGO (US EGO) signal based on the amount of oxygen upstream of the catalyst 136. The DS EGO sensor 139 generates a downstream EGO (DS EGO) signal based on the amount of oxygen downstream of the catalyst 136.

The US and DS EGO sensors 138 and 139 may each include a universal EGO (UEGO) sensor (also referred to as a wide band or wide range EGO sensor), or another suitable type of EGO sensor. EGO sensors can also be referred to as air/fuel ratio sensors. For example, a wide range EGO sensor may be referred to as a wide range air/fuel (WRAF) sensor. A switching EGO sensor generates an EGO signal in units of voltage, and switches the EGO signal between a low voltage (e.g., approximately 0.2 V) and a high voltage (e.g., approximately 0.8 V) when the oxygen concentration is lean and rich, respectively. By way of contrast, the UEGO sensor generates an EGO signal that corresponds to an EQR of the exhaust gas and provides measurements between rich and lean.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include one or more boost devices, such as a turbocharger or a supercharger, that provide(s) pressurized air to the intake manifold 110. For example, FIG. 1 shows a turbocharger including a turbocharger turbine 160-1 that is driven by exhaust gases flowing through the exhaust system 134. The turbocharger also includes a turbocharger compressor 160-2 that is driven by the turbocharger turbine 160-1 and that compresses air leading into the throttle valve 112. The engine system 100 may include more than one boost device, such as sequential or parallel turbochargers.

A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162. In various implementations, multiple turbochargers may be controlled by the wastegate actuator module 164. The turbocharger(s) may have variable geometry, which may be controlled by a turbo actuator module (not shown).

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The other sensors 193 include an ambient air pressure sensor, an accelerator pedal position (APP) sensor, a clutch pedal position (CPP) sensor (e.g., in the case of a manual transmission), and may include one or more other types of sensors. An APP sensor measures a position of an accelerator pedal within a passenger cabin of the vehicle. A CPP sensor measures a position of a clutch pedal within the passenger cabin of the vehicle. The other sensors 193 may also include one or more acceleration sensors that measure longitudinal acceleration of the vehicle. The ECM 114 may use signals from the sensors to make control decisions for the engine system 100.

The ECM 114 may communicate with a transmission control module 194, for example, to coordinate engine operation with gear shifts in a transmission 195. For example, the ECM 114 may reduce engine torque during a gear shift. The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark timing. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence (or pattern), fueling rate, intake and exhaust cam phaser angles, target wastegate opening, and EGR valve opening, respectively. The ECM 114 may control the actuator values in order to cause the engine 102 to generate a requested engine output torque.

Figure 2:
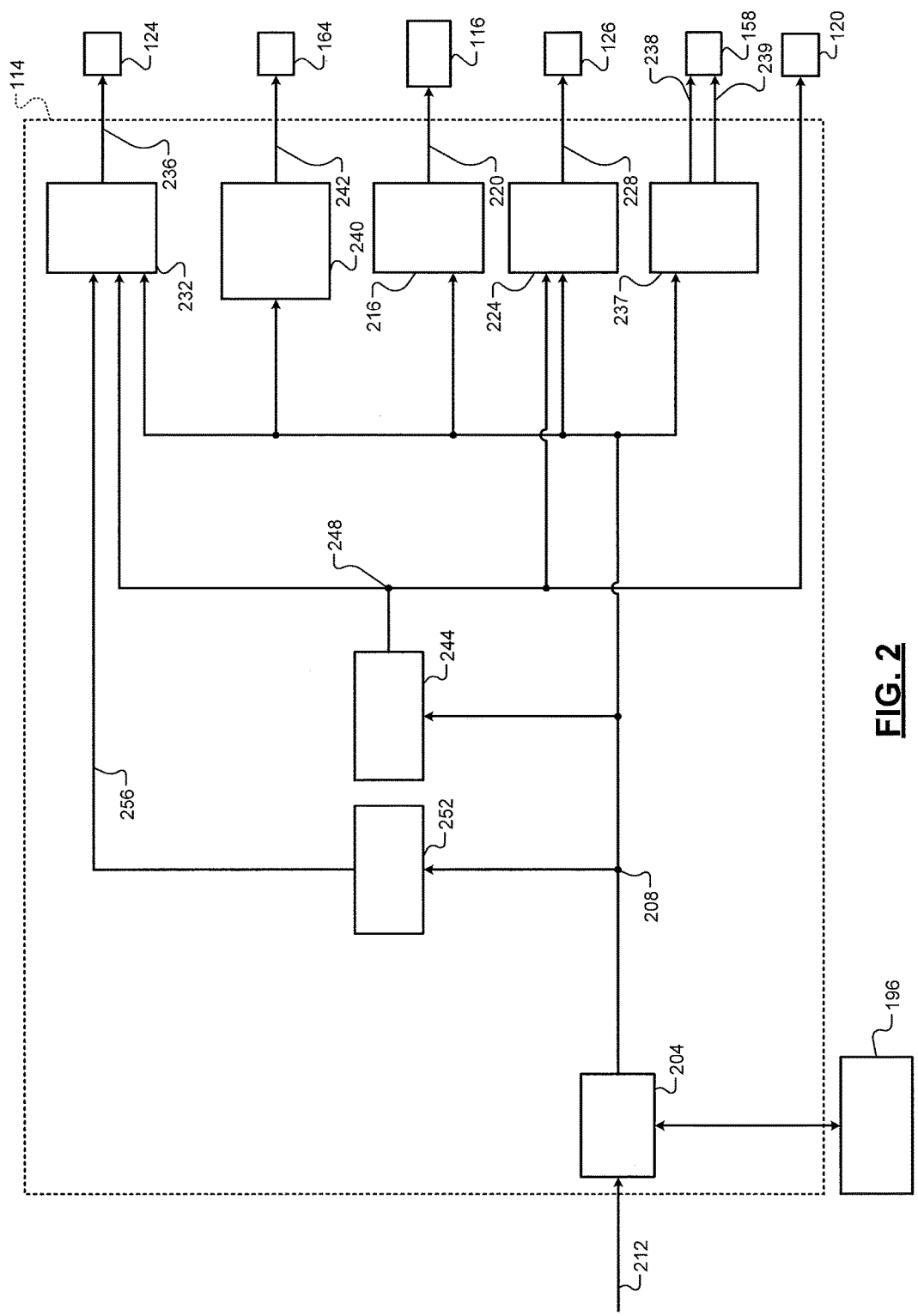
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. For example, the torque request 208 may increase as the accelerator pedal position increases (relative to a predetermined resting accelerator pedal position, such as zero) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include a final equivalence ratio (EQR) request, number of fuel injections for injecting the amount, and timing for each of the injections. The fuel actuator module 124 injects fuel based on the target fueling parameters 236. The final EQR request is discussed further below.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A wastegate control module 240 sets a target wastegate opening 242 based on the torque request 208. The wastegate actuator module 164 controls opening of the wastegate 162 based on the target wastegate opening 242. For example only, the wastegate actuator module 164 may determine a target duty cycle (DC) to apply to the wastegate 162 based on the target wastegate opening 242 using a function or mapping that relates target wastegate openings to target DCs. The wastegate actuator module 164 may apply a signal to the wastegate 162 based on the target DC.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated. The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated.

Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed.

A command generator module 252 may determine one or more engine operating conditions. For example only, the engine operating conditions may include, but are not limited to, engine speed, air per cylinder (APC), engine load, and/or other suitable parameters. The APC may be predicted for one or more future combustion events in some engine systems. The engine load may be determined based on, for example, a ratio of the APC to a maximum APC of the engine 102. The engine load may alternatively be determined based on an indicated mean effective pressure (IMEP), engine torque, or another suitable parameter indicative of engine load.

The command generator module 252 also generates a base equivalence ratio (EQR) request 256. The base EQR request 256 is based on a target equivalence ratio (EQR) of the air/fuel mixture upstream of the catalyst 136. For example only, the target EQR may include a stoichiometric EQR (i.e., 1.0). In various implementations, the command generator module 252 may toggle the base EQR request 256 between predetermined rich and lean EQRs. The command generator module 252 may also adjust the base EQR request 256 based on one or more operating parameters, such as the torque request 208. For example, the command generator module 252 may fuel richer the base EQR request 256 when the torque request 208 increases.

As discussed further below, the fuel control module 232 receives the base EQR request 256 and generates the final EQR request based on the base EQR request 256 and any errors between a measured EQR obtained using the US EGO sensor 138 at a given instance and an expected EQR for that instance. The fuel control module 232 determines the expected EQR based on delays between when fuel is injected and when exhaust resulting from that fuel injection will be reflected in the measured EQR. These delays may be generally referred to as delays of the engine system 100.

Figure 3:
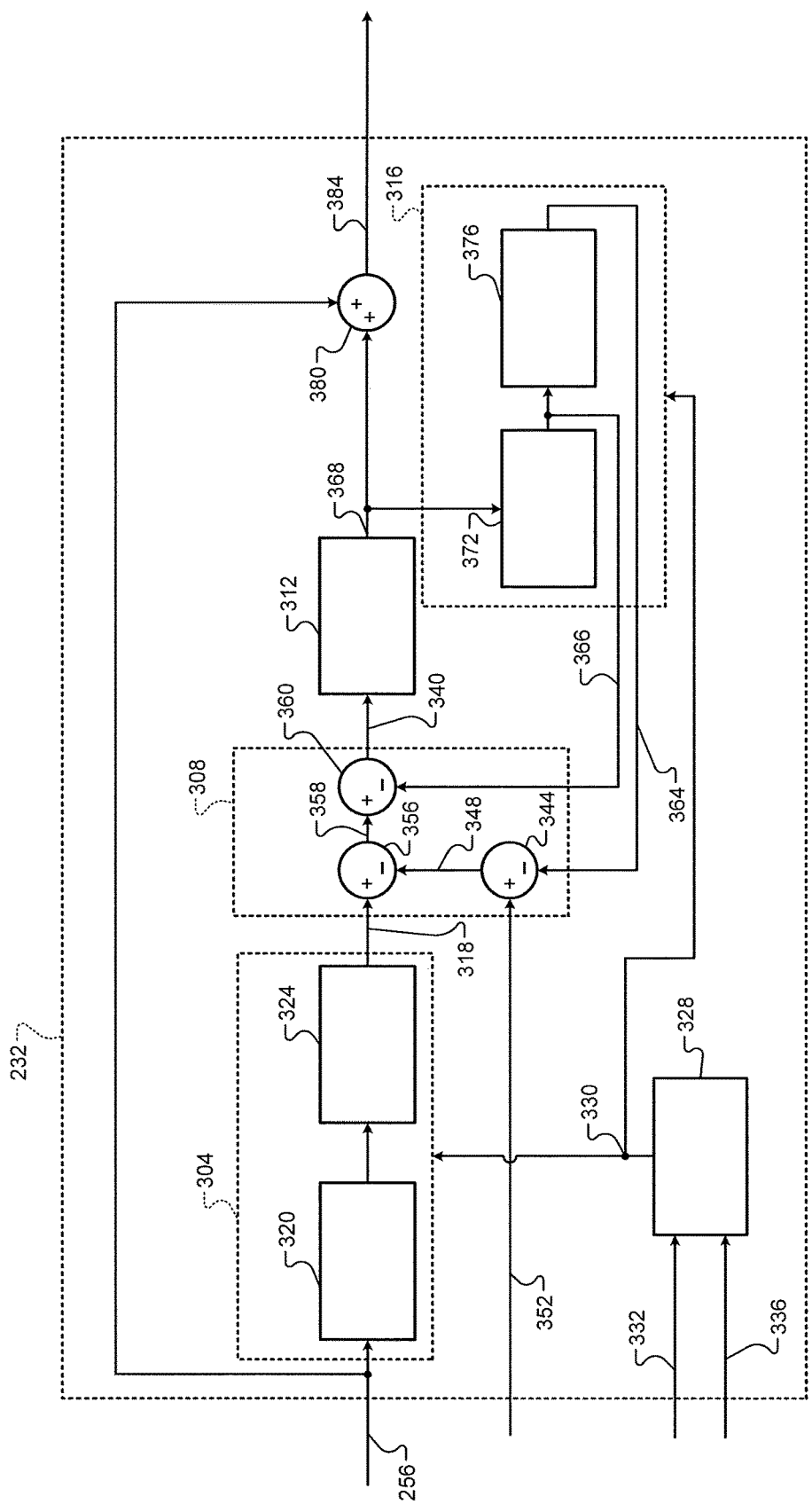
FIG. 3 is a functional block diagram of an example implementation of a fuel control module.

FIG. 3 is a functional block diagram of an example implementation of the fuel control module 232. The fuel control module 232 may include an EQR delay module 304, a feedback module 308, a closed loop module 312, and a correction delay module 316.

The delays of the engine system 100 may include, for example, an engine delay, a transport delay, and a sensor delay. The engine delay may correspond to a period between, for example, when fuel is provided to a cylinder of the engine 102 and when the resulting exhaust is expelled from the cylinder. The engine delay may be a fixed value or a variable, for example, based on an engine speed (RPM). The transport delay may correspond to a period between when the resulting exhaust is expelled from the cylinder and when the resulting exhaust reaches the location of the US EGO sensor 138. The transport delay is variable, for example, based on exhaust flow rate. The sensor delay may correspond to the delay between when the resulting exhaust reaches the location of the US EGO sensor 138 and when the resulting exhaust is reflected in the US EGO signal. The sensor delay may be a fixed value or variable depending on a sensor time constant.

The EQR delay module 304 determines a delayed base EQR 318 based on the base EQR request 256. The delayed base EQR request 318 may also be referred to as a predicted EQR as it corresponds to a predicted value of a measured EQR at a given time. The EQR delay module 304 may include a sensor delay module 320 and a transport delay module 324. The sensor delay module 320 and the transport delay module 324 determine a sensor delay and a transport delay, respectively, based on an exhaust flow rate 330. The sensor delay module 320 may determine the sensor delay, for example, using an equation or a lookup table that relates exhaust flow rates to sensor delays. The transport delay module 324 may determine the transport delay, for example, using an equation or a lookup table that relates exhaust flow rates to transport delays.

An exhaust flow rate module 328 determines the exhaust flow rate 330 based on a MAF 332 into the engine 102 and an engine speed 336, for example, using an equation or a lookup table that relates MAFs and engine speeds to exhaust flow rates. The MAF 332 may be measured using the MAF sensor 186, and the engine speed 336 may be measured using the crankshaft position sensor 180.

The EQR delay module 304 accounts for the sensor delay and the transport delay in determining the delayed base EQR 318. The EQR delay module 304 stores the EQR of the base EQR request 256 and may determine the delayed base EQR 318 based on one or more stored EQRs given the sensor and transport delays. For example, the EQR delay module 304 may set the delayed base EQR 318 for a present control loop based on or equal to the EQR of the base EQR request 256 stored a number of control loops earlier, where the number of control loops earlier corresponds to a mathematical sum of the sensor and transport delays.

The feedback module 308 determines a feedback value 340 based on the delayed base EQR 318 and a plurality of closed loop corrections. A first difference module 344 sets an EQR error 348 based on or equal to a difference between a delayed closed loop correction 364 and a measured EQR 352. The measured EQR 352 corresponds to a present EQR measured by the US EGO sensor 138. As discussed further below, the delayed closed loop correction 364 is delayed to account for both the sensor and transport delays.

A second difference module 356 sets a second EQR difference 358 based on or equal to a difference between the delayed base EQR 318 and the EQR error 348. A third difference module 360 sets the feedback value 340 based on or equal to a difference between the second EQR difference 358 and a second delayed closed loop correction 366. In contrast with the delayed closed loop correction 364 which is delayed to account for both the sensor and transport delays, as discussed further below, the second delayed closed loop correction 366 is delayed to only account for the sensor delay.

The closed loop module 312 determines a closed loop correction 368 based on the feedback value 340. For example only, the closed loop module 312 may include a proportional-integral (PI) controller, a proportional (P) controller, an integral (I) controller, a proportional-integral-derivative (PID) controller, or another suitable type of closed loop controller that determines the closed loop correction 368 based on the feedback value 340.

The correction delay module 316 determines the delayed closed loop correction 364 and the second delayed closed loop correction 366 based on the closed loop correction 368. Like the EQR delay module 304, the correction delay module 316 may include a sensor delay module 372 and a transport delay module 376. The sensor delay module 372 determines the sensor delay based on the exhaust flow rate 330, and the transport delay module 376 determines the transport delay based on the exhaust flow rate 330. The sensor delay module 372 may determine the sensor delay, for example, using an equation or a lookup table that relates exhaust flow rates to sensor delays. The transport delay module 376 may determine the transport delay, for example, using an equation or a lookup table that relates exhaust flow rates to transport delays.

The sensor delay module 372 imposes the sensor delay, while the transport delay module 376 imposes the transport delay. The delayed closed loop correction 364 therefore accounts for both the sensor delay and the transport delay. For example, the sensor delay module 372 stores the EQR of the closed loop correction 368 and may determine the second delayed closed loop correction 366 based on one or more stored EQRs given the sensor delay. The sensor delay module 372 may, for example, set the second delayed closed loop correction 366 for a present control loop based on or equal to the EQR of the closed loop correction 368 stored a second number of control loops earlier, where the second number of control loops earlier corresponds to the sensor delay.

The transport delay module 376 stores the EQR of the second delayed closed loop correction 366 and may determine the delayed closed loop correction 364 based on one or more stored EQRs given the transport delay. The transport delay module 376 may, for example, set the delayed closed loop correction 364 for a present control loop based on or equal to the EQR of the second delayed closed loop correction 366 stored a third number of control loops earlier, where the third number of control loops earlier corresponds to the transport delay. The sensor delay module 320 and the transport delay module 324 may function similarly or identically to the sensor delay module 372 and the transport delay module 376 to impose the sensor and transport delays on the base EQR request 256.

A summer module 380 determines a final EQR request 384 based on the base EQR request 256 and the closed loop correction 368. For example, the summer module 380 may set the final EQR request 384 based on or equal to a mathematical sum of the base EQR request 256 and the closed loop correction 368. The final EQR request 384 is one of the target fueling parameters 236, discussed above. The fuel actuator module 124 controls fuel injection to the engine 102 based on the final EQR request 384 and the other target fueling parameters 236.

Figure 4:
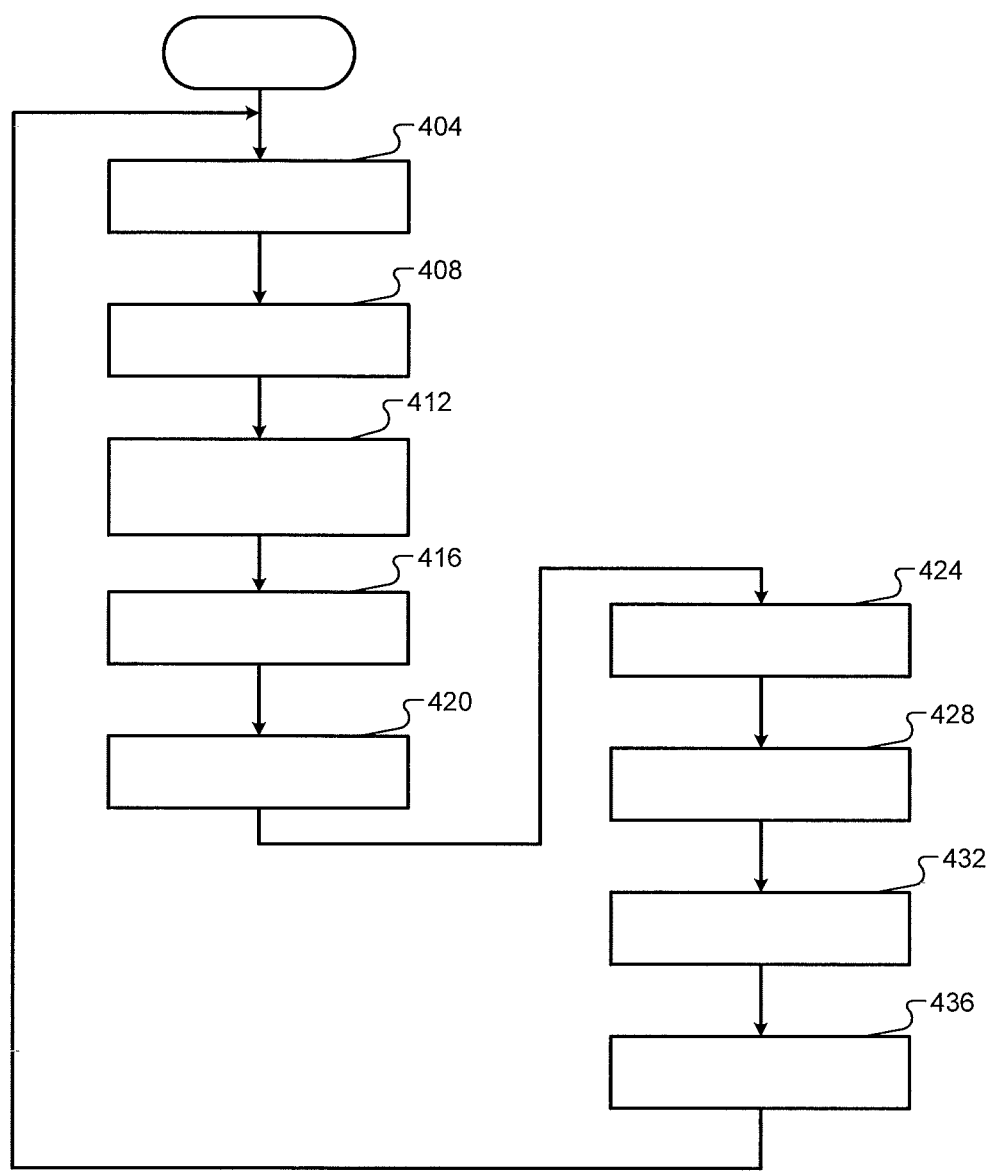
FIG. 4 is a flowchart depicting an example method of controlling fueling of an engine.

FIG. 4 is a flowchart depicting an example method of controlling fueling of an engine. At 404, the fuel control module 232 may obtain the base EQR request 256 for a present control loop. The fuel control module 232 stores the EQR of the base EQR request 256 at 408. A number of control loops in the future corresponding to a mathematical sum of the sensor and transport delays, this stored EQR will be used as the delayed base EQR 318. As stated above, the delayed base EQR 318 may be referred to as a predicted EQR as it represents a predicted value of the measured EQR 352 for the present control loop. At 412, for the present control loop, the EQR delay module 304 retrieves the EQR of the base EQR request 256 stored the number of control loops before the present control loop and uses this retrieved EQR as the delayed base EQR 318. Again, this number of control loops corresponds to the mathematical sum of the sensor delay and the transport delay. The sensor and transport delay modules 320 and 324 determine the sensor and transport delays, respectively, based on the exhaust flow rate 330.

At 416, the feedback module 308 determines the feedback value 340. The first difference module 344 determines the EQR error 348 based on the difference between the delayed closed loop correction 364 and the measured EQR 352 for the present control loop. The measured EQR 352 is measured using the US EGO sensor 138. The delayed closed loop correction 364 is a delayed version of the closed loop correction 368 accounting for both the sensor and transport delays. Updating of the delayed closed loop correction 364 for a next control loop is discussed further below. The second difference module 356 sets the second EQR difference 358 for the present control loop based on or equal to a difference between the delayed base EQR 318 and the EQR error 348. The third difference module 360 sets the feedback value 340 for the present control loop based on or equal to a difference between the second EQR difference 358 and the second delayed closed loop correction 366 for the present control loop. The second delayed closed loop correction 366 is a delayed version of the closed loop correction 368 accounting for the sensor delay. Updating of the second delayed closed loop correction 366 for a next control loop is discussed further below.

At 420, the closed loop module 312 determines the closed loop correction 368 for the present control loop based on the feedback value 340 determined for the present control loop and one or more other previous feedback values determined for previous control loops, respectively. For example, the closed loop module 312 may determine the closed loop correction 368 using a PI control controller.

At 424, the correction delay module 316 stores the closed loop correction 368. A number of control loops in the future corresponding to a mathematical sum of the sensor and transport delays, this stored closed loop correction 368 will be used as the delayed closed loop correction 364.

At 428, the summer module 380 sets the final EQR request 384 for the present control loop based on or equal to the mathematical sum of the base EQR request 256 and the closed loop correction 368 for the present control loop. At 432, the fuel actuator module 124 controls fuel injection for a cylinder based on the final EQR request 384.

At 436, the sensor delay module 372 updates the second delayed closed loop correction 366 for the next control loop, and the transport delay module 376 updates the delayed closed loop correction 364 for the next control loop. For example, the sensor delay module 372 may set the second delayed closed loop correction 366 for the next control loop based on or equal to the EQR of the closed loop correction 368 stored the second number of control loops earlier, where the second number of control loops earlier corresponds to the sensor delay. The transport delay module 376 may set the delayed closed loop correction 364 for the next control loop based on or equal to the EQR of the second delayed closed loop correction 366 stored the third number of control loops earlier, where the third number of control loops earlier corresponds to the transport delay. Control returns to 404 for a next control loop.

While the example of fuel control has been provided, the delay module 304, the feedback module 308, the closed loop module 312, and the correction delay module 316 could be used to control another engine actuator or in another type of system having delay.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit" The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fuel control system of a vehicle, comprising:
an equivalence ratio (EQR) delay module that, based on a base EQR request received for a first control loop, sets a delayed base EQR request for a second control loop,
wherein a first period between the first and second control loops corresponds to a sum of:
a first delay period of an exhaust gas oxygen (EGO) sensor; and
a second delay period for exhaust to flow from a cylinder of an engine to the EGO sensor;
a closed loop module that determines a closed loop correction for the second control loop based on:
the delayed base EQR request for the second control loop;
an EQR measured using the EGO sensor for the second control loop;
a first value of the closed loop correction determined for the first control loop; and
a second value of the closed loop correction determined for a third control loop,
wherein a second period between the second and third control loops corresponds to the first delay period of the EGO sensor;
a summer module that sets a final EQR request for the second control loop based on the base EQR request for the second control loop plus the closed loop correction for the second control loop; and
a fuel actuator module that controls fuel injection to the engine based on the final EQR request.

2. The fuel control system of claim 1 wherein the summer module sets the final EQR request for the second control loop equal to the base EQR request for the second control loop plus the closed loop correction for the second control loop.

3. The fuel control system of claim 1 further comprising a feedback module that determines a feedback value for the second control loop as a function of:
the delayed base EQR request for the second control loop;
the EQR measured using the EGO sensor for the second control loop;
the first value of the closed loop correction determined for the first control loop; and
the second value of the closed loop correction determined for the third control loop,
wherein the closed loop module determines the closed loop correction for the second control loop based on the feedback value determined for the second control loop and one or more values of the feedback value determined for one or more other control loops, respectively.

4. The fuel control system of claim 3 wherein the closed loop module determines the closed loop correction for the second control loop using a proportional-integral (PI) controller based on the feedback value determined for the second control loop and one or more values of the feedback value determined for one or more control loops, respectively.

5. The fuel control system of claim 3 wherein the feedback module sets the feedback value based on:
the delayed base EQR request for the second control loop;
minus a first difference between (i) the EQR measured using the EGO sensor for the second control loop and (ii) the first value of the closed loop correction determined for the first control loop; and
minus the second value of the closed loop correction determined for the third control loop.

6. The fuel control system of claim 1 further comprising an exhaust flow rate module that determines a flow rate of exhaust through an exhaust system of the engine,
wherein the EQR delay module sets at least one of the first period and the second period based on the flow rate of exhaust.

7. The fuel control system of claim 6 wherein:
the first period is a fixed, predetermined value; and
the EQR delay module sets the second period based on the flow rate of exhaust.

8. The fuel control system of claim 6 wherein the exhaust flow rate module determines the flow rate of exhaust through the exhaust system of the engine based on at least one of a mass flowrate of air into the engine and an engine speed.

9. The fuel control system of claim 1 wherein the EGO sensor is located upstream of a catalyst in an exhaust system of the engine.

10. The fuel control system of claim 1 further comprising a command generator module that generates the base EQR request based on a stoichiometric EQR.

11. A fuel control method for a vehicle, comprising:
based on a base equivalence ratio (EQR) request received for a first control loop, setting a delayed base EQR request for a second control loop,
wherein a first period between the first and second control loops corresponds to a sum of:
a first delay period of an exhaust gas oxygen (EGO) sensor; and
a second delay period for exhaust to flow from a cylinder of an engine to the EGO sensor;
determining a closed loop correction for the second control loop based on:
the delayed base EQR request for the second control loop;
an EQR measured using the EGO sensor for the second control loop;
a first value of the closed loop correction determined for the first control loop; and
a second value of the closed loop correction determined for a third control loop,
wherein a second period between the second and third control loops corresponds to the first delay period of the EGO sensor;

setting a final EQR request for the second control loop based on the base EQR request for the second control loop plus the closed loop correction for the second control loop; and controlling fuel injection to the engine based on the final EQR request.

12. The fuel control method of claim 11 wherein setting the final EQR request includes setting the final EQR request for the second control loop equal to the base EQR request for the second control loop plus the closed loop correction for the second control loop.

13. The fuel control method of claim 11 further comprising determining a feedback value for the second control loop as a function of:

the delayed base EQR request for the second control loop;
the EQR measured using the EGO sensor for the second control loop;
the first value of the closed loop correction determined for the first control loop; and
the second value of the closed loop correction determined for the third control loop,
wherein determining the closed loop correction includes determining the closed loop correction for the second control loop based on the feedback value determined for the second control loop and one or more values of the feedback value determined for one or more other control loops, respectively.

14. The fuel control method of claim 13 wherein determining the closed loop correction includes determining the closed loop correction for the second control loop using a proportional-integral (PI) controller based on the feedback value determined for the second control loop and one or more values of the feedback value determined for one or more control loops, respectively.

15. The fuel control method of claim 13 wherein setting the feedback value includes setting the feedback value based on:

the delayed base EQR request for the second control loop;
minus a first difference between (i) the EQR measured using the EGO sensor for the second control loop and (ii) the first value of the closed loop correction determined for the first control loop; and
minus the second value of the closed loop correction determined for the third control loop.

16. The fuel control method of claim 11 further comprising:

determining a flow rate of exhaust through an exhaust system of the engine; and
setting at least one of the first period and the second period based on the flow rate of exhaust.

17. The fuel control method of claim 16 wherein:

the first period is a fixed, predetermined value; and
setting at least one of the first period and the second period includes setting the second period based on the flow rate of exhaust.

18. The fuel control method of claim 16 wherein determining the flow rate of exhaust includes determining the flow rate of exhaust through the exhaust system of the engine based on at least one of a mass flowrate of air into the engine and an engine speed.

19. The fuel control method of claim 11 wherein the EGO sensor is located upstream of a catalyst in an exhaust system of the engine.

20. The fuel control method of claim 11 further comprising generating the base EQR request based on a stoichiometric EQR.

* * * * *